350-358 SR
XR 3,568,102 SR

United States Patent

[11] 3,568,102

[72] Inventor Chin Chong Tseng
San Carlos, Calif.
[21] Appl. No. 651,530
[22] Filed July 6, 1967
[45] Patented Mar. 2, 1971
[73] Assignee Litton Precision Products, Inc.
San Carlos, Calif.

[54] SPLIT SURFACE WAVE ACOUSTIC DELAY LINE
17 Claims, 3 Drawing Figs.

[52] U.S. Cl. ........................................................ 333/30,
333/72, 330/5, 350/161, 343/853
[51] Int. Cl. ........................................................ H03h 7/30
[50] Field of Search ........................................... 333/29, 30,
72, 7; 330/5; 329/129; 350/161

[56] References Cited

UNITED STATES PATENTS

| | | | |
|---|---|---|---|
| 3,300,739 | 1/1967 | Mortley | 333/30 |
| 3,378,793 | 4/1968 | Mortley | 333/30 |
| 3,283,264 | 11/1966 | Papadakis | 333/6 |
| 3,400,341 | 9/1968 | Sittig | 333/30 |
| 3,310,761 | 3/1967 | Brauer | 333/30 |
| 3,289,114 | 11/1966 | Rowen | 333/30 |

OTHER REFERENCES

R. M. White et al. " Ultra-Sonic Surface Wave Amplification" Applied Physics Letters Vol. 8 02 Jan. 15, 1966 p. 40—42

*Primary Examiner*—Herman Karl Saalbach
*Assistant Examiner*—C. Baraff
*Attorneys*—Alan C. Rose, Alfred B. Levine, Ronald W. Reagin and Ronald M. Goldman

ABSTRACT: An acoustic delay line having an input and a plurality of output transducers is provided which includes at least one reflective grating, a plurality of adjacent spaced conductive strips, coupled to the surface of a piezoelectric layer for splitting an acoustic surface wave traveling across the surface of the piezoelectric layer into two components, one of which continues to travel in the original direction and the other of which travels skew to that direction. Each of the original and reflected portions are detected by the output transducers.

Significantly, the reflective grating affords the basis for multiple output delay lines of various apparent applications, of structural simplicity and of minimal interference between input and output transducers.

3568102
OR IN 333/30R

INVENTOR:
Chin-Chong Tseng

By Ronald M. Goldman

ATTORNEY

INVENTOR:
Chin-Chong Tseng
By Ronald M. Goldman
ATTORNEY

SPLIT SURFACE WAVE ACOUSTIC DELAY LINE

This invention relates to a device in which an output signal is produced a predetermined period of time subsequent to the application of an input signal, and more particularly, to a delay or scanning device in which an input signal is converted into an acoustic surface wave that propagates along the surface of a piezoelectric medium and is detected at each one of a plurality of spaced output transducers at finite different instances of time.

Delay devices containing multiple outputs are presently used in many well-known systems which require one or more signals to be separated by a precise increment of time. In those systems such a device permits selection of the desired incremental delay by selection of the appropriate output tap on the delay line. One such system is the beam splitter found in modern radar circuits. Moreover, still different systems use multiple output delay lines as scanning switches. Therein each of a plurality of outputs on a delay line is connected to a corresponding gate which is in turn connected to a corresponding one of a plurality of sensors in a matrix. Subsequent to the application on an input pulse, each gate is momentarily and serially energized and the presence or absence of a signal upon the corresponding sensor is detected and gated to proper electronic equipment. Applications for the latter include scanning light sensor matrices found in solid state television and large area displays, infrared, ultrasonic, microwave, and millimeter wave sensor matrices.

Heretofore an acoustic delay device has been proposed which has an input transducer and a plurality of output transducers located spaced apart on the surface of a piezoelectric medium. High frequency signals supplied to the input transducer are thereby converted into an acoustic surface wave which travels or propagates down the surface of the piezoelectric medium and passes, successively, each of the plurality of output transducers. Each of the output transducers detects the propagating surface wave as it passes and produces an electrical output signal in response thereto.

Although the proposed approach appears desirable, a device so constructed possessed some difficulties in practice. Since each transducer is located in the path of the propagating acoustic surface wave, the wave is attenuated at each output transducer. Moreover, the presence of each transducer in the path of the wave caused reflections. These reflections traveled back to a preceeding output transducer and the input transducer and created interference and extraneous signals.

It is therefore an object of the invention to provide an acoustic surface wave delay line with structure that substantially reduces interference between the output transducers.

It is another object of the invention to provide an improved acoustic surface wave delay line which can be miniaturized and is compatible with integrated circuits.

It is a further object of the invention to provide an acoustic surface wave scanning device which provides increased isolation between output transducers.

Briefly stated, a transducer is coupled to the surface of a piezoelectric medium or layer for converting electrical signals supplied to the input thereof into an acoustic surface wave which travels in a first path across the surface of the layer. A plurality of output transducers are spaced apart and coupled to the same surface and at least one reflective grating is provided located in the path of travel of the acoustic surface wave. Each reflective grating provided reflects a portion of the incident acoustic wave in a second path skew to the first path to a corresponding output transducer and permits the remainder of the acoustic surface wave to continue travel in the original direction.

Further in accordance with an aspect of the invention, an output transducer is provided to detect any of such remainder.

Further in accordance with the invention, the reflective grating comprises a plurality of adjacent spaced parallel conductive strips attached to the surface of the piezoelectric layer and skew to or aligned to an angle to the first path of travel of the acoustic surface wave.

The foregoing and other objects and advantages of the invention become apparent upon review of the following detailed description taken together with the drawings in which.

Figure 1:
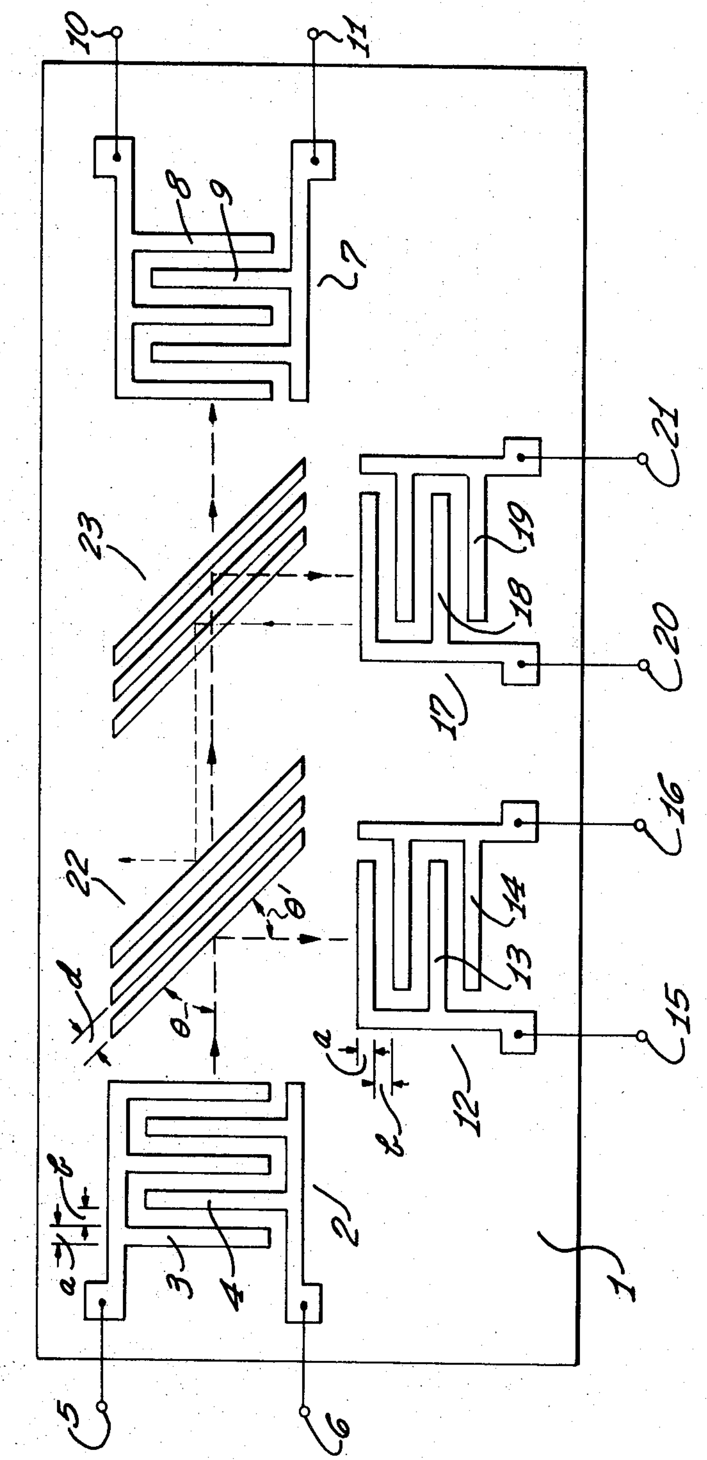
FIG. 1 illustrates a detailed construction of a delay line according to the invention which has numerous outputs.

The embodiment of FIG. 1 shows a medium or layer of piezoelectric material 1 having a smoothly polished surface. The layer 1 is of a thickness preferably greater than one wavelength at the frequency which is to be used as the input signal. Such piezoelectric material may be quartz, lithium niobate, zinc oxide crystals, or any other suitable piezoelectric crystals or ceramics. Additionally, piezoelectric layer 1 may be supported on any other convenient surface of a suitable material, such as glass or ceramic.

An input transducer 2 is coupled to the surface of piezoelectric layer 1. In this embodiment input transducer 2 consists of a plurality of interdigitated strips or fingers 3 and 4 in opposed hands which are fabricated onto the surface of a layer 1. The hands and fingers are of electrically conductive material such as aluminum or other metal. The fingers of each hand are electrically in common and connected to an input terminal 5. Likewise, the fingers of the other hand are electrically in common and connected to the opposite polarity input terminal 6. In input transducer 2 receives electrical energy applied from a suitable source, not illustrated, and converts this energy into an acoustic surface wave which travels outwardly from input transducer 2 in a first path of travel along the surface of piezoelectric layer 1 between input transducer 2 and an output transducer 7. Output transducer 7 is coupled to the surface of piezoelectric layer 1 and consists of interdigitated fingers 8 and 9 of conductive material in opposed hands which are fabricated onto the surface of layer 1. Fingers 8 are electrically in common and connected to an output terminal 10. Fingers 9 are electrically in common and connected to an output terminal 11.

An output transducer 12 is coupled at a spaced position off of the said first path of travel to the surface of piezoelectric layer 1. Transducer 12 includes interdigitated fingers 13 and 14 of conductive material in opposed hands which are fabricated onto the surface of piezoelectric layer 1. Fingers 13 are electrically in common and connected to a terminal 15. Fingers 14 are electrically in common and connected to a terminal 16. A fourth output transducer 17 is coupled to layer 1 at a spaced position and contains interdigitated fingers 18 and 19 of conductive material in opposed hands. Fingers 18 are electrically in common and connected to terminal 20. Fingers 19 are electrically in common and connected to terminal 21.

Each of the intermediate output transducers 12 and 17 is spaced from one another and is located off of the direct or first path between input transducer 2 and the first named or final output transducer 7.

A plurality of adjacent spaced parallel conductive strips 22 suitably of aluminum or other conductive material, are fabricated on the surface of the piezoelectric layer at a location intercepting the first path of travel of the acoustic surface wave in front of output transducer 12 and skew or aligned at an angle $\Theta$ to first path extending directly between input transducer 2 and output transducer 7. Spaced therefrom is a second plurality of adjacent spaced parallel conductive strips 23 which are attached to the surface of piezoelectric layer 1, located in the first path between input transducer 2 and output transducer 7 in front of output transducer 17, and skew or aligned at an angle $\Theta$ to that first path. Each of these plurality of 22 and 23 strips form an angle $\Theta'$ between the axis of the strips and a direct or second path to the respective output transducer 12 and 17 which it confronts.

Each of the input and output transducers, and sets of conductive strips in FIG. 1 are deposited as a thin aluminum film upon the surface of piezoelectric layer 1 by an evaporation and photoresist process conventional in the integrated circuit art and which need not be described in detail. This provides a firm connection or bond between the conductive fingers of each transducer and the conductive strips, and the surface of piezoelectric layer 1.

In operation an alternating current pulse or pulses from a suitable circuit or source, not illustrated, and typically of the high frequency range is applied between input terminals 5 and 6 to input transducer 2. Input transducer 2 converts the high frequency electrical energy into an acoustic surface wave. The mechanics of such conversion are believed to be as described.

Because the adjacent fingers of input transducer 2 are oppositely charged, electric fields are established therebetween through the piezoelectric layer. Inasmuch as a piezoelectric material is one in which strain and stresses is induced inside the material by the application of an external field, and conversely, electric fields are induced inside the medium by application of a mechanical stress, the electric field established between the fingers induce a stress in the piezoelectric layer 1. The stress so induced causes the propagation or travel of a stress wave along the surface of the material and which is termed an acoustic surface wave.

Analogous to this type of motion is the surface wave which propagates or travels along the surface of the earth in an earthquake or the ripple produced by dropping a body in a pool of water.

As the polarity of the input signal reverses the electric field between adjacent fingers of the input transducer likewise reverses. Accordingly, because the nature of the piezoelectric material the direction of the induced stress also reverses direction.

This acoustic wave effectively propagates or travels across the surface of the piezoelectric material in a first path toward output transducer 7.

As is known, the velocity of propagation of an acoustic wave is much slower than the velocity with which electromagnetic energy propagates through space. Hence, although the frequency of the electrical signal applied to input transducer 2 is in the high frequency or microwave frequency range, since it is converted into an acoustic signal, the time required for such signal to travel between positions on the layer 1 is long relative to the time required for an electromagnetic wave to traverse the same distance. Hence, workable delay intervals in a dimensionally small body are provided.

Since the layer is of piezoelectric material, the acoustic wave has inseparately associated therewith a piezoelectric wave; that is, electrical potential differences that appear in a piezoelectric material between points under different mechanical stress. As this acoustic surface wave travels in a first path from transducer 2 to transducer 7, it successively intercepts each of the sets 22 and 23 of angularly displaced conductive strips. Each one of the plurality of conductive strips in the set 22 has a given surface area which electrically short circuits the piezoelectric material lying beneath. Because each of those conductive strips sets up a boundary condition requiring a zero electric field beneath the strip, a portion of any piezoelectric wave incident upon such strip in the set must to satisfy those boundary conditions be reflected and travels in a second path skew to the first path toward output transducer 12. The remainder of the acoustic wave, not attenuated, continues to travel past the set of conductive strips 12 in the first path of travel toward the subsequent set of conductive strips 23. Likewise, as the acoustic surface wave travels to the next set of strips 23, in order to satisfy the boundary conditions required by the presence of each of the short circuiting conductive strips in the set 23, a portion of the propagating acoustic surface wave incident upon reaching the strips 23 is reflected in a second path of travel toward output transducer 17 at an angle or skew to the original or first path of travel, while the remainder of the acoustic wave continues in the first path toward output transducer 7. Hence, each of the sets of conductive strips 22 and 23 is a reflective grating having a coefficient or reflectance and transmissivity.

The behavior, reflection and refraction, of acoustic and piezoelectric surface waves at the boundary between an uncoated and metallic coated surfaces is readily understood by the following alternative explanation. It has been determined that the velocity of surface waves on a piezoelectric surface coated with conductive film is slightly slower than that on the uncoated surface. When a change of velocity occurs as an acoustic surface wave propagates from one region on the surface to another, reflection and refraction take place at that boundary. This is analogous to the reflection of a light beam, as it impinges upon the surface of a glass, since in glass the velocity of light is slightly lower than the velocity in free space.

Those portions of the acoustic surface wave traveling to output transducers 12, 17, and 7 are thereat received, detected, and converted from an acoustic signal back into electrical signals of the input signal frequency. This conversion is believed to occur as follows: Since the acoustic surface wave causes what may be termed minute ripples or alternate crests or troughs similar to a wave, as such surface wave passes the interdigitated fingers of any of the transducers, it causes a type of motion of those fingers analogous to the motion of spaced bobbing corks. Because the acoustic wave is essentially a traveling stress and the layer upon which the stress travels is of piezoelectric material, which exhibits the property of producing a potential or voltage difference between different locations under different stress, a corresponding potential difference appears between the finger of each of the output transducers as the acoustic surface wave passes.

The acoustic wave travels between the input transducer 2 and each of the output transducers at a finite acoustic velocity or speed. Hence, the time in which this wave travels to each of the output transducers is finite and different and depends on the relative distance of such transducer from input transducer 2. Hence, the acoustic surface wave in accordance with the relation velocity × time =distance progresses to each output transducer at a different period of time and electrical pulses are successively generated at the outputs of successively spaced output transducers. Thus, the embodiment of FIG. 1 possesses the utility of a multiple tap delay line or scanning switch.

It is understood that although transducer 2 is designated an input transducer that is done only because the input signal is applied to that transducer in the operation illustrated in FIG. 1 and described as a delay line with multiple taps or a scanning switch and accordingly transducers 7, 12, and 17 are designated output transducers because an output signal is taken therefrom.

Since each of the transducers is of a common construction it is apparent that they can be used interchangeably as input or output transducers. Thus, in other applications other than that described in FIG. 1 a signal source may be connected to either transducer 7 or 17 and accordingly such transducer is then designated an input transducer. In such application it is apparent that the original path taken by the acoustic surface wave generated at the input transducer is thus considered the first path of travel as herein described.

It is also apparent that a longer layer of piezoelectric material permits the addition of additional reflective gratings and corresponding output transducers. The only limitation on length of a single delay line appears due to attenuation of the acoustic surface wave. Likewise, as is apparent, a lesser number of reflective gratings and output transducers than that illustrated in FIG. 1 may be constructed.

The spacing between each of the conductive strips forming the reflective grating affords some control over the amount or proportion of the acoustic wave that is reflected to the output transducer and that which continues to travel along the original path.

For maximum reflection to each output transducer, the spacing of conductive strips satisfies "Bragg's" law: $2d \sin \Theta = n\lambda$ where $d$ is the distance as hereinafter discussed between the front edge of adjacent conductive strips, $n$ is an interger; $\Theta$ is the angle of incidence and $\lambda$ is the acoustic wavelength of the input frequency, $f$, i.e. $f\lambda = v$ the acoustic velocity in the piezoelectric medium.

Because of the width of the conductive strip the distance, *d*, between conductive strips is indicated in FIG. 1 to be measured by the distance between the elongated front edge of one strip and the corresponding elongated front edge of the adjacent strip in reflective grating 22. A like spacing is effected by taking the distance, *d*, as that between corresponding elongated back edges of adjacent strips. Alternatively, that distance, *d*, may be expressed as the sum of the width of a strip and the actual spacing between adjacent conductive strips.

As a plane wave of wavelength, $\lambda$, encounters a periodic structure, which in the illustrated embodiment is formed of parallel conductive strips, of periodicity *d*, a strong reflection occurs if Bragg's law is satisfied. If the spacing satisfies Bragg's law then the acoustic wave reflected by each conductive strip in the reflective grating is constructively added in phase and a maximum amount of the acoustic energy is reflected to the output transducer.

If the spacing departs from that required to satisfy Bragg's law, then a smaller portion of the intercepted acoustic surface wave is reflected to the corresponding output transducer and a greater proportion continues to travel along the original path. This result is necessitated by well known principals of conservation of energy. Preferably, the reflective grating in the illustrated embodiment satisfies Bragg's law.

An additional control over the proportion of the acoustic surface wave is provided by the size of the reflective grating chosen. To reflect a greater proportion of the acoustic wave to an output transducer the size of the grating is increased. That is, instead of two conductive strips, a third and or a fourth is applied to the surface of the piezoelectric layer. A limiting factor is that as the number of conductive strips is increased, the grating becomes frequency selective narrowing the bandwidth of reflected frequencies.

A third but inefficient control over the portion of the acoustic surface wave reflected to an output transducer is to vary the angle $\Theta'$ at which the output transducer is located relative to the reflective grating. This may be accomplished either by locating the output transducer at a different angle, $\Theta'$, retaining the grating at the angle illustrated in FIG. 1, or by changing the angle $\Theta$ which the reflective grating forms with the path of travel of the acoustic wave while leaving the output transducer in the location shown. With either of these procedures the output transducer in the location shown. With either of these procedures the output transducer is located off of the angle of reflection (i.e. the angle of reflection equals the angle of incidence according to well known principles) and hence, receives a lesser portion of the reflected acoustic energy while the remainder of that reflected travels by the output transducer and is lost. This lost energy is obviously wasted. Consequently, the use of this manner of design adjustment lowers the overall efficiency of the device.

In the embodiment of the invention illustrated in FIG. 1, the acoustic wave travels along the surface of piezoelectric layer 1 and portions thereof are reflected at each reflective grating. As an example, if each grating reflects one-fourth of the energy incident thereupon to its associated output transducer, each of the three output transducers illustrated will receive the following relative levels of signal strength assuming no other attenuation: ¼; ¾ × ¼ or 3/16; and ¼ (3/16) or 9/16.

It is apparent that by varying the design parameters in the manners discussed the outputs of each of the transducers can within the delay line itself be equalized to some extent to afford a more uniform output. As an example, the spacing of the first relative grating may depart slightly from that which satisfies Bragg's equation and one of the conductive strips deleted. Hence, this grating reflects less than a one-fourth portion of the incident energy. Likewise, the next reflective grating may contain an additional conductive strip and reflects a portion of incident energy greater than one-fourth.

The space, *b*, between fingers in each of the input and output transducers and the width, *a*, of each finger is preferably made approximately one-quarter wavelength at the center frequency of the signal that is to be applied to the input so that the total distance between the center of adjacent fingers is one-half wavelength.

Since adjacent fingers are at opposite potential during the application of the input signal, the mechanical stress created in one-half cycle of the layer along the direction or propagation between each two adjacent fingers is sinusoidal and one-half wavelength. Upon the reversal in polarity due to the input signal going through the other half-cycle, this spatial pattern of the stress pattern created in the piezoelectric layer reverses. However, if the half wavelength distance between fingers is maintained, then the propagating elastic wave created by the preceeding two fingers will arrive additively in phase with the stress created between the subsequent adjacent field in the direction of propagation. Otherwise partial cancellation occurs.

It is apparent that with the foregoing construction back reflections of acoustic waves from the grating or an output transducer back to the input transducer and especially to preceeding output transducers is considerably reduced. For instance, a reflection from a subsequent grating 23 or transducer 17 is incident upon the preceeding grating 22. In accordance with the principals of reflection, a portion of this wave is reflected outward by reflective grating 22 away from preceeding output transducer 12, and the wave traveling back to the input transducer is accordingly reduced in magnitude by reflected portion. Hence, much interference is avoided.

Figure 2:
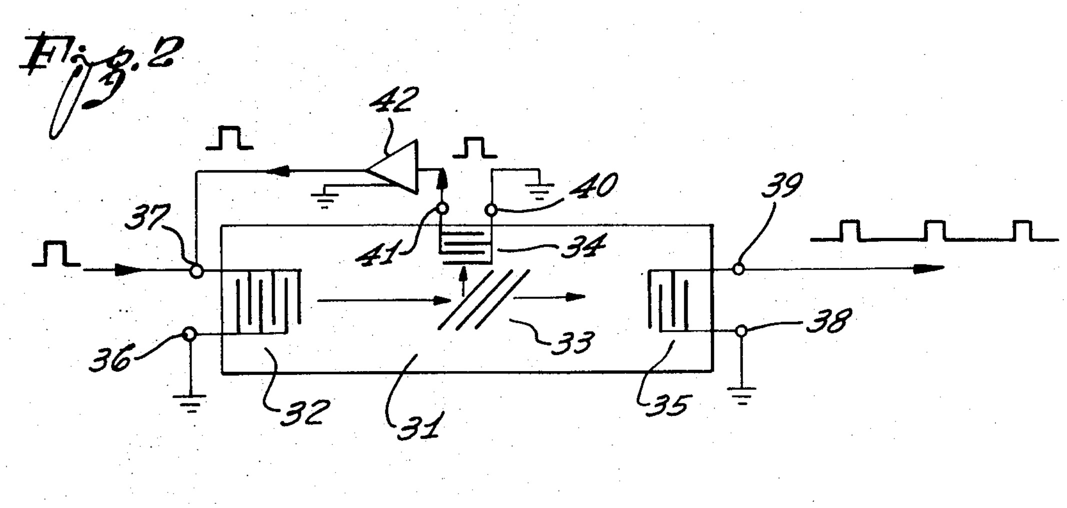
FIG. 2 illustrates a modification of the invention incorporated in an oscillator or closed loop delay line; and, FIG. 3 illustrates another embodiment using plural delay lines as applied to a directional antenna system.

FIG. 2 symbolically illustrated a novel oscillator, or closed loop delay line, embodying a delay line constructed in accordance with the principles discussed with respect to FIG. 1. A layer 31 of piezoelectric material sustains the propagation of acoustic surface waves coupled thereto from an input transducer 32 along a path to a reflective grating 33 which reflects a portion of the acoustic wave to a first output transducer 34 and the remaining portion to a second output transducer 35 each of which converts the acoustic energy received into a corresponding electrical signal. One terminal of each transducer 36, 38, and 40, respectively is grounded or connected to any other suitable potential. A wide band amplifier 42 has an input connected to receive the output signal from output transducer 34 at terminal 41. The output of amplifier 42 is coupled to the input of input transducer 32 at terminal 37.

In operation, an initial pulse is applied to input transducer 32 from any suitable source, not illustrated, which may even be a voltage generated by noise. This pulse is converted to an acoustic surface wave by input transducer 32 and travels along piezoelectric layer 31. At reflective grating 33, a portion of the incident acoustic energy is reflected to output transducer 34 and the remainder passes through the grating to output transducer 35 where it is detected and converted into an output signal appearing between terminals 38 and 39.

The reflected portion of the acoustic wave is detected by transducer 34 which converts it into an output signal appearing between terminals 40 and 41. This output signal is applied to the input of amplifier 42 where the signal is amplified to its original level accounting for any attenuation in the path between transducers 32 and 34. The amplified or restored signal is reapplied to the input transducer between terminals 36 and 37 of transducer 32 which then converts this electrical signal into an acoustic surface wave.

This sequence of events is repeated for this and each subsequent path. Consequently, a series of spaced pulses appears between output terminals 38 and 39 of output transducer 35.

The output of this pulse generator may be connected to any one of the multitude of circuits which use such pulses.

Figure 3:
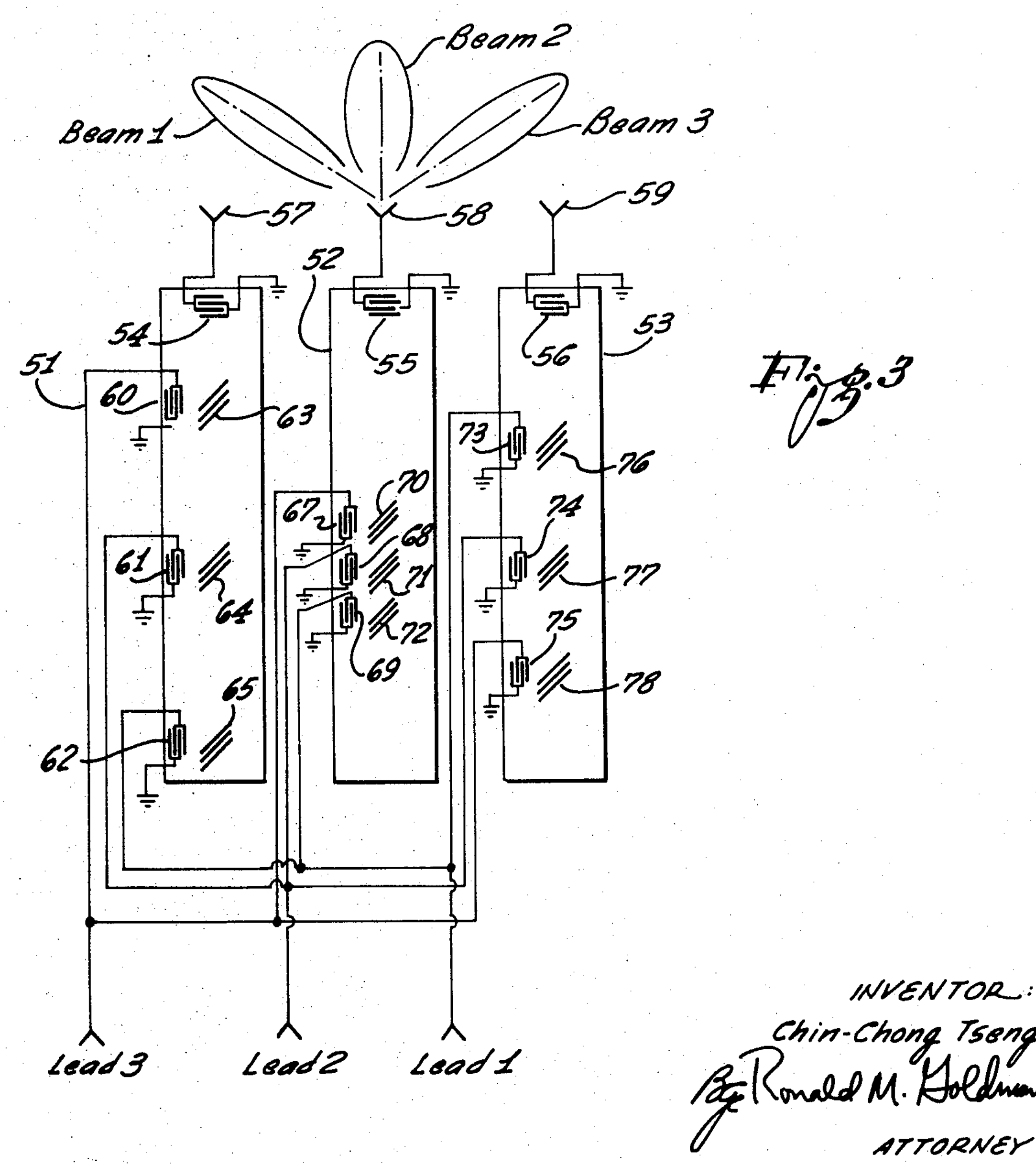

FIG. 3 depicts beam forming networks for both receiving and transmitting radar signals. For receiving, a received signal which comes from the direction of beam 01 provided the highest signal strength at lead 01; from the direction of beam 02 provides the highest signal strength at leads 02 and so forth as between other outputs on the remaining leads. For transmitting radar signals, the signal applied at lead 01 will form a radiating pattern with its main lobe in the direction of beam 01; applied at lead 02 forms the beam in direction 02 and so forth.

Three multitapped delay lines 51, 52, and 53, constructed in accordance wit with the principals of the invention discussed in relation to FIG. 1, are provided. Each delay line contains a respective input transducer 54, 55, and 56 connected to a corresponding spaced antenna 57, 58, and 59.

The first delay line includes three output transducers 60, 61, 62 and corresponding reflective gratings 63, 64, and 65. These transducers are respectively spaced from the input transducer 54 by distances indicated in phase angles of $(\Delta\Phi - \delta)$, $2\Delta\Phi$, and $3\Delta\Phi + \delta$, where $$\Delta\varphi = |2\pi\frac{d}{\lambda}\sin\theta_o|$$

and $d$ is the distance between the antennas, $\Theta_o$ the angular arc between the beam lobes, and $\lambda$ the wavelength of the signal.

The second delay line 52 includes three spaced output transducers 67, 68, and 69, and corresponding reflective gratings 70, 71, and 72. These transducers are respectively spaced from input transducer 55 by distances expressed in phase angle of $2\Delta\Phi + \delta$; $2\Delta\Phi$; and $2\Delta\Phi + \delta$.

The third delay line 53 includes three spaced output transducers 73, 74, and 75, and corresponding reflective gratings 76, 77, and 78. These transducers are respectively spaced from input transducer 56 by distances expressed in phase angle of $\Delta\Phi + \delta$, $2\Delta\delta$; $3\Delta\Phi - \delta$.

The outputs of transducers 62, 69, and 73 are connected in common to lead 1; the output of transducers 61, 68, and 74 are connected in common to lead 2, and the output of transducers 60, 67, and 75 are connected in common to lead 3.

As is apparent, conventional amplifiers may be connected at the input of the delay line or at the outputs to increase the level of the signals if such is desirable.

The principal of operation is easily understood by considering its function during receiving. For transmitting the opposite of the following occurs. In receiving when the electromagnetic wave arrives from the direction of beam 57, as shown in FIG. 3, the wave front reaches the antenna 57 first and then antennas 58 and 59 after a phase lag of $\Delta\Phi$, and $2\Delta\Phi$, respectively. Each of the transducers 54, 55, and 56 convert the electromagnetic waves into acoustic waves which travel along the respective layers of piezoelectric material in delay lines 51, 52, and 53. Taking the phase of the signal at antenna 57 as a reference, the outputs of transducers 62, 69, and 73 are in phase $(3\Delta\Phi + \delta)$. Since these 3 transducers are connected to lead 01 and their outputs are in phase, the signals add and the output at lead 01 is stronger than that which appears on leads 02, and 03. By comparison, lead 02 is connected to transducers 61, 68, and 74 which gives signals of phases $2\Delta\Phi$, $3\Delta\ \Phi$, and $4\Delta\Phi$, which are obviously not in phase. Thus, lead 02 does not give as strong a signal as that appearing on lead 01. Likewise, the output transducers 60, 67, and 75 are connected to leads 03 and have signals of different phases of $(\Delta\Phi - \delta)$, $(3\Delta\Phi - \delta)$, and $(5\Delta\Phi - \delta)$ and hence do not add. When the electromagnetic wave comes from the direction of beam 58, the wave front reaches the three antennas at the same time, and taking antenna 2 or transducer 55 as the reference phase, and the in-phase $2\Delta\delta$ or strongest output signal appears at lead 02.

Similarly, when the electromagnetic wave comes from the direction of beam 03, the strongest output appears at lead 03. In that instance, output signals from transducers 60, 67, and 74 are all in-phase e.g., all are $3\Delta\Phi$—$\delta$ taking antenna 59 or transducer 56 as the reference phase. These same principals apply to directional transmitting of signals. Thus, the direction of the beam can be steered electronically by switching the applied signal at the leads 01, 02, and 03.

It is to be understood that this invention is not restricted to the particular details as described above, as many equivalents suggest themselves to those skilled in the art. The foregoing embodiments, it is understood, are presented solely for purposes of illustration and are not intended to limit the invention as defined by the breadth and scope of the appended claims.

I claim:

1. An acoustic surface wave device comprising in combination: A layer of piezoelectric material having a smooth surface input acoustic surface wave transducer means coupled to said surface of said layer for converting electrical signals supplied thereto into an acoustic surface wave which travels along the surface of said layer in at least one predetermined first path of travel; a reflective grating comprising a plurality of spaced strips of metallic material coupled to said surface of said layer and positioned across and skew to said first path of travel for reflecting a portion of said acoustic surface wave along a second path on said surface skew to said first path and permitting the passage of the remaining portion of said acoustic surface wave substantially in said first path of travel along said surface; and output acoustic surface wave transducer means spaced from said input transducer means coupled to said surface of said layer in said second path of travel for producing an electrical output signal in response to passage of said reflected portion of said acoustic surface wave.

2. The invention as defined in claim 1 further comprising a final output transducer means coupled to said surface of said layer at a predetermined position in said first path on the side of said reflective grating opposite said input transducer for producing an electrical output signal in response to the passage of said remaining portion of said acoustic surface wave.

3. The invention as defined in claim 1 wherein said plurality of strips in said reflective grating are spaced apart a predetermined distance and parallel and aligned skew to said first path.

4. The invention as defined in claim 3 wherein each of said transducer means and said output transducer means further comprise a plurality of adjacent spaced parallel conductive strips and means to connect adjacent strips to opposite polarity terminals.

5. The invention as defined in claim 4 wherein said strips comprising said transducer means contain elongated front and back edges and one of said edges of at least one of said strips is spaced from a corresponding one of said edges of an adjacent strip by a distance of $\lambda/2$ where $\lambda = v/f$ and $f$ is a predetermined input signal frequency and $v$ is the acoustic velocity in said layer.

6. The invention as defined in claim 3 wherein said conductive strips comprising said reflective grating and said first path defines a predetermined angle, $\Theta$, and wherein each one of said adjacent spaced parallel strips comprising said reflective grating possess elongated front and back edges and wherein at least one of the said edges of one of said strips is spaced from a corresponding edge of an adjacent strip by a distance, $d$, which is substantially equal to $n\ \lambda/2 \sin\Theta$, where $n$ is an integer, and $\lambda$ is the acoustic wavelength in said layer of a predetermined frequency, $f$.

7. The invention as defined in claim 6 wherein each of said edges and corresponding edges comprises a front edge.

8. The invention as defined in claim 3 wherein said conductive strips comprising each reflective grating and said first path defines a predetermined angle, $\Theta$, wherein adjacent strips in each reflective grating are spaced by a distance, $s$, and have a width, $t$, and $s$+$t$ is substantially equal to $n\lambda/2\sin\Theta$, where $n$ is an integer and $\lambda$ is the acoustic wavelength in said layer of a predetermined frequency, $f$.

9. In combination: A layer of piezoelectric material having a smooth surface; transducer means coupled to said surface for converting electrical signals supplied thereto into an acoustic surface wave which travels along the surface of said layer in at least one predetermined first path; a plurality of reflective gratings of metallic material coupled to said surface and spaced from one another in said first path along the surface of said layer; each of said reflective gratings responsive to an incident acoustic surface wave for reflecting a portion thereof in a path along said surface skew to said first path and permitting passage of the remaining portion thereof in said first path of travel; a plurality of output transducers corresponding to the plurality of reflective gratings and spaced along said surface; each one of said output transducers being coupled to the surface of said layer confronting a corresponding one of said plurality of reflective gratings and located substantially in said path of travel of said reflected portion of said acoustic surface wave reflected from said corresponding reflective grating and responsive to the incidence of an acoustic surface wave for producing an electrical output signal.

10. The invention as defined in claim 9 further comprising an additional output transducer coupled to said layer and located in said path of travel of said acoustic surface wave and beyond the last one of said plurality of reflective gratings for producing an electrical output signal in response to the incidence of an acoustic surface wave.

11. The invention as defined in claim 10 wherein each of said plurality of said reflective gratings comprise a plurality of adjacent spaced parallel conductive strips coupled to said surface and skew to said first path of travel of said acoustic surface wave.

12. The invention as defined in claim 11 wherein each of said input and output transducers comprise a plurality of interdigitated thin conductive strips.

13. The invention as defined in claim 11 wherein said conductive strips comprising each said reflective grating and said first path define a predetermined angle, Θ, and wherein each one of said adjacent spaced parallel strips comprising each said reflective grating possess elongated front and back edges, and wherein at least one of the said edges of one of said strips is spaced from a corresponding edge of an adjacent strip by a distance, *d*, which is substantially equal to $n\lambda/2\sin\Theta$, where *n* is an integer, and λ is the acoustic wavelength in said layer of a predetermined frequency, *f*.

14. The invention as defined in claim 13 wherein each of said edges and corresponding edges comprises a front edge.

15. The invention as defined in claim 11 wherein said conductive strips comprising each reflective grating and said first path define a predetermined angle, Θ, and wherein adjacent strips in each reflective grating are spaced by a distance, *s*, and have a width, *t*, and $s+t$ is substantially equal to $n\lambda/2\sin\Theta$, where *n* is an integer and is the acoustic wavelength in said layer of a predetermined frequency, *f*.

16. The invention as defined in claim 15 wherein said strips comprising said transducer means contain elongated front and back edges and one of said edges of at least one of said strips is spaced from a corresponding one of said edges of an adjacent strip by a distance of $\lambda/2$, where $\lambda = v/f$ and *f* is a predetermined input signal frequency and *v* is the acoustic velocity in said layer.

17. An acoustic surface wave device comprising in combination: A piezoelectric layer having a flat surface capable of sustaining the propagation of an acoustic surface wave at a predetermined first velocity; first acoustic surface wave transducer means coupled to said surface of said piezoelectric layer and responsive to an electrical input signal for producing a corresponding acoustic surface wave for travel in a first direction; a thin metallic coating having a major axis inclined at an angle to said first direction of travel located on a portion of said surface of said piezoelectric layer at a predetermined position spaced from said input transducer and from any edges of said piezoelectric layer for lowering the acoustic velocity with which an acoustic surface wave travels thereby to create a difference in the acoustic propagation velocity between the coated and uncoated portions of said layer whereby a portion of any acoustic surface wave is reflected along said surface in a second direction skew to its original direction of propagation; and second acoustic surface wave transducer means coupled to said surface responsive to a reflected acoustic surface wave traveling in said second direction for providing an electrical output signal corresponding thereto.